US011579963B2

(12) United States Patent
Hara et al.

(10) Patent No.: US 11,579,963 B2
(45) Date of Patent: Feb. 14, 2023

(54) MAINTENANCE SUPPORT DEVICE, MAINTENANCE SUPPORT METHOD, AND MAINTENANCE SUPPORT PROGRAM

(71) Applicant: Hitachi, Ltd., Tokyo (JP)

(72) Inventors: Akihiro Hara, Tokyo (JP); Yoshihiro Yoshii, Tokyo (JP); Akira Deguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/475,152

(22) Filed: Sep. 14, 2021

(65) Prior Publication Data

US 2022/0245019 A1 Aug. 4, 2022

(30) Foreign Application Priority Data

Jan. 29, 2021 (JP) .............................. JP2021-013124

(51) Int. Cl.
*G06F 11/00* (2006.01)
*G06F 11/07* (2006.01)

(52) U.S. Cl.
CPC ...... *G06F 11/0793* (2013.01); *G06F 11/0727* (2013.01); *G06F 11/0751* (2013.01)

(58) Field of Classification Search
CPC ............. G06F 11/0706; G06F 11/0727; G06F 11/0751; G06F 11/0754; G06F 11/0766; G06F 11/079; G06F 11/0793
See application file for complete search history.

(56) References Cited

U.S. PATENT DOCUMENTS

| 6,715,097 | B1* | 3/2004 | Kidder | G06F 11/0715 714/2 |
| 2009/0106603 | A1* | 4/2009 | Dilman | G06F 11/327 714/E11.002 |
| 2016/0062857 | A1* | 3/2016 | Tadano | G06F 11/2033 714/4.11 |
| 2020/0117532 | A1* | 4/2020 | Wolfson | G06F 11/0709 |
| 2021/0042180 | A1* | 2/2021 | Sutton | B62B 3/1404 |

FOREIGN PATENT DOCUMENTS

JP H10187232 A 7/1998

\* cited by examiner

*Primary Examiner* — Anthony J Amoroso
(74) *Attorney, Agent, or Firm* — Procopio, Cory, Hargreaves & Savitch LLP (57) ABSTRACT

To be able to support the efficient handling of problems during maintenance. A management board determines an accomplishment sequence of handling manipulation for failures on a maintenance target. The management board includes a CPU, memory, and a storage device. The memory or the storage device stores: condition information associating the handling manipulation with a condition concerning at least accomplishment or non-accomplishment of the manipulation; and failure handling information that associates a failure occurring on the maintenance target with the handling manipulation. The CPU is configured to determine the accomplishment sequence of the handling manipulations so that multiple handling manipulations for multiple failures occurring on the maintenance target satisfy the condition.

6 Claims, 10 Drawing Sheets

| SEVERITY | TIME OF OCCURRENCE | DESCRIPTION | WORKAROUND |
|---|---|---|---|
| MEDIUM | 10:00 | I/O PATH FAILURE WITH HOST | ADD I/O PATH |
| MEDIUM | 10:01 | LAN PORT FAILURE | REPLACE LAN PORT |

| ACCOMPLISHMENT TIME | MANIPULATION |
|---|---|
| 9:50 | GENERATE VOLUME |
| ⋮ | ⋮ |

| MANIPULATION | PREREQUISITE MANIPULATION |
|---|---|
| ADD I/O PATH | REPLACE LAN PORT |
| RECOVER BLOCKED VOLUME | RECOVER BLOCKED POOL |
| RECOVER BLOCKED POOL | REPLACE DRIVE, RECOVER I/O PATH TO EXTERNAL STORAGE, OR ADD I/O PATH TO EXTERNAL STORAGE |
| ⋮ | ⋮ |

| SEVERITY | TIME OF OCCURRENCE | DESCRIPTION | WORKAROUND | ACCOMPLISHMENT SEQUENCE | ACCOMPLISHMENT SITUATION |
|---|---|---|---|---|---|
| MEDIUM | 10:00 | FAILURE ON I/O PATH TO HOST | ADD I/O PATH | 2 | UNACCOMPLISHED |
| MEDIUM | 10:01 | LAN PORT FAILURE | REPLACE LAN PORT | 1 | UNACCOMPLISHED |

| SEVERITY | TIME OF OCCURRENCE | DESCRIPTION | WORKAROUND |
|---|---|---|---|
| MEDIUM | 10:00 | CPU INACTIVATED | RECOVER CPU |
| HIGH | 10:01 | I/O PROCESSING BOARD INACTIVATED | RESTART I/O PROCESSING BOARD |

| MANIPULATION | UNNECESSARY MANIPULATION |
|---|---|
| RESTART I/O PROCESSING BOARD | CPU RECOVERY |
| RESTART I/O PROCESSING BOARD | I/O PATH REIDENTIFICATION |
| REPLACE ALL I/O PROCESSING BOARDS | MEMORY REPLACEMENT |
| ⋮ | ⋮ |

| SEVERITY | TIME OF OCCURRENCE | DESCRIPTION | WORKAROUND | ACCOMPLISHMENT SEQUENCE | ACCOMPLISHMENT SITUATION |
|---|---|---|---|---|---|
| MEDIUM | 10:00 | CPU INACTIVATED | RECOVER CPU | | UNNECESSARY |
| HIGH | 10:01 | I/O PROCESSING BOARD INACTIVATED | RESTART I/O PROCESSING BOARD | 1 | UNACCOMPLISHED |

| | 162a | 162b | 162c | 162d | 162 |
|---|---|---|---|---|---|

| SEVERITY | TIME OF OCCURRENCE | DESCRIPTION | WORKAROUND |
|---|---|---|---|
| MEDIUM | 10:00 | STORAGE DEVICE FAILURE | REPLACE DRIVE ACQUIRE DUMP |
| MEDIUM | 10:01 | STORAGE DEVICE FAILURE | REPLACE DRIVE ACQUIRE DUMP |
| MEDIUM | 10:10 | STORAGE DEVICE FAILURE | REPLACE DRIVE ACQUIRE DUMP |

FIG.16

| ACCOMPLISHMENT TIME | MANIPULATION |
|---|---|
| 10:08 | ACQUIRE DUMP |
| 10:05 | REPLACE DRIVE |
| 9:50 | GENERATE VOLUME |
| ⋮ | ⋮ |

FIG.17

| MANIPULATION | ACCOMPLISHMENT UNNECESSITATING CONDITION |
|---|---|
| ACQUIRE DUMP | AVAILABILITY OF DUMP DATA ACQUIRED AFTER FAILURE OCCURRENCE |
| UNLOCK MANIPULATION | UNLOCKED MANIPULATION |
| ⋮ | ⋮ |

FIG.18

| SEVERITY | TIME OF OCCURRENCE | DESCRIPTION | WORKAROUND | ACCOMPLISHMENT SEQUENCE | ACCOMPLISHMENT SITUATION |
|---|---|---|---|---|---|
| MEDIUM | 10:00 | STORAGE DEVICE FAILURE | REPLACE DRIVE | 1 | ACCOMPLISHED |
| | | | ACQUIRE DUMP | 2 | ACCOMPLISHED |
| MEDIUM | 10:01 | STORAGE DEVICE FAILURE | REPLACE DRIVE | 3 | UNACCOMPLISHED |
| | | | ACQUIRE DUMP | | UNNECESSARY |
| MEDIUM | 10:10 | STORAGE DEVICE FAILURE | REPLACE DRIVE | 4 | UNACCOMPLISHED |
| | | | ACQUIRE DUMP | 5 | UNACCOMPLISHED |

FIG.19

MAINTENANCE SUPPORT DEVICE, MAINTENANCE SUPPORT METHOD, AND MAINTENANCE SUPPORT PROGRAM

BACKGROUND

The present invention relates to a maintenance support apparatus, for example, to support maintenance of a maintenance target instrument.

For example, an administrator maintains a storage apparatus targeted at maintenance in a calculator system. Such an administrator is required to have a higher level of knowledge about the storage apparatus.

However, it may be difficult to acquire an administrator having a higher level of knowledge. Therefore, there is a need for a mechanism that enables even an administrator not having sufficient knowledge to perform proper maintenance.

For example, Japanese Unexamined Patent Application Publication No. Hei 10 (1998)-187232 discloses a technology that assigns importance to each alert, and preferentially displays the alert corresponding to high importance as well as a method for handling the alert.

SUMMARY

When multiple alerts occur, for example, the technique disclosed in Japanese Unexamined Patent Application Publication No. Hei 10 (1998)-187232 makes it possible to easily determine which alert needs to be handled first in order of importance. However, the alert handling may be inefficient simply based on the importance.

If alerts of the same importance occur, for example, the number of handling procedures or the handling time as a whole may depend on which of the alerts of the same importance needs to be handled first. There is a risk of handling the alerts in the order that increases the number of steps or the handling time. There is also a risk of individually handling multiple alerts to redundantly take the same measure and increasing the number of steps or the handling time.

The present invention has been made in consideration of the foregoing. It is therefore an object of the invention to provide a technology that supports efficient handling of problems during maintenance.

To achieve the above-described object, a maintenance support apparatus according to one aspect determines an accomplishment sequence of handling manipulations for failures on a maintenance target. The maintenance support apparatus includes a processor and a storage device connected to the processor. The storage device stores: condition information that associates the handling manipulation with a condition concerning at least accomplishment or non-accomplishment of the manipulation; and failure handling information that associates a failure occurring on the maintenance target with the handling manipulation. The processor determines an accomplishment sequence of handling manipulations so that the handling manipulations for failures occurring on the maintenance target satisfy the condition.

The present invention can support the efficient handling of problems during maintenance.

DETAILED DESCRIPTION

Embodiments will be described by reference to the accompanying drawings. The embodiments explained below do not limit the invention according to the scope of patent claims. All the elements and combinations thereof explained in the embodiments are not necessarily required for means to solve the problems of the invention.

The description below may explain information in the form of an "AAA table." However, the information may be represented in any data structure. The "AAA table" can be represented as "AAA information" to show that the information is independent of data structures.

The description below may explain a "program" as the subject of processes. The program is executed by a processor such as a CPU (Central Processing Unit) to perform predetermined processes while appropriately using a storage portion (such as memory) and/or an interface device. Therefore, the subject of processes may be assumed to be the processor (or a device or a system provided with the processor). The processor may include a hardware circuit that performs all or part of processes. The program may be installed from a program source on a device such as a calculator. The program source may be a program distribution server or a computer-readable recording medium (such as a portable recording medium), for example. In the following description, two or more programs may be implemented as one program, or one program may be implemented as two or more programs.

Figure 1:
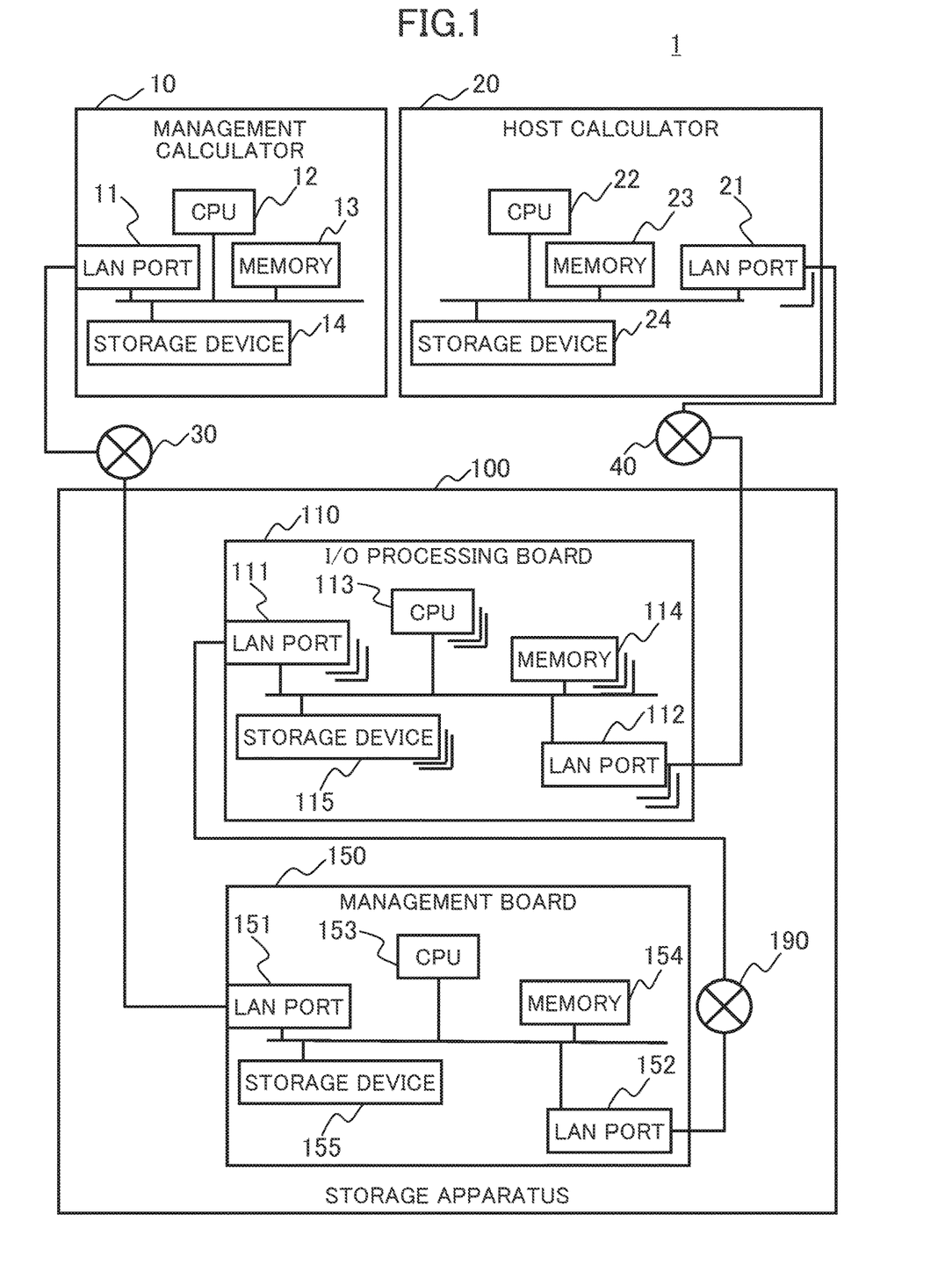
FIG. 1 is an overall configuration diagram illustrating a maintenance support system according to a first embodiment.

FIG. 1 is an overall configuration diagram illustrating a maintenance support system according to a first embodiment;

A maintenance support system 1 includes a management calculator 10, a host calculator 20, and a storage apparatus 100. The management calculator 10 and the storage apparatus 100 are connected via a management network 30. The host calculator 20 and the storage apparatus 100 are connected via a network 40. The management network 30 and the network 40 represent communication channels such as a wired LAN (Local Area Network) and a wireless LAN, for example.

The management calculator 10 is composed of a PC (Personal Computer), for example, and is operated by an administrator (user) who manages the storage apparatus 100. The management calculator 10 includes a LAN port 11, a CPU (Central Processing Unit) 12, memory 13, and a storage device 14.

The LAN port 11 provides an interface such as a wired LAN card or a wireless LAN card and communicates with the storage apparatus 100 via the management network 30.

The CPU 12 executes various processes according to programs stored in the memory 13 and/or the storage device 14.

The memory 13 represents RAM (RANDOM ACCESS MEMORY), for example, and stores programs executed by the CPU 12 and necessary information.

The storage device 14 represents a hard disk or flash memory, for example, and stores programs executed by the CPU 12 or data used by the CPU 12. For example, the storage device 14 stores a web browser that transmits input information from the administrator of the management calculator 10 to the storage apparatus 100, acquires information about a screen to display predetermined information from the storage apparatus 100 and displays the information.

The host calculator 20 is composed of a PC, for example, and is used to read data from the storage apparatus 100 and perform predetermined processes, or to write data acquired from predetermined processes to the storage apparatus 100. The host calculator 20 includes multiple LAN ports 21, a CPU 22, memory 23, and a storage device 24. According to the present embodiment, the plural multiple LAN ports 21 are used to provide redundancy, but one LAN port 21 may be used.

The LAN port 21 provides an interface such as a wired LAN card or a wireless LAN card and communicates with the storage apparatus 100 via the network 40. The present embodiment uses the network 40 to configure a data I/O path between the host calculator 20 and the storage apparatus 100.

The CPU 22 executes various processes according to programs stored in the memory 23 and/or the storage device 24.

The memory 23 represents RAM, for example, and stores programs executed by the CPU 22 and necessary information.

The storage device 24 represents a hard disk or flash memory, for example, and stores programs executed by the CPU 22 and data used by the CPU 22.

The storage apparatus 100 includes an I/O processing board 110 and a management board 150 as an example of the maintenance support apparatus. The I/O processing board 110 and the management board 150 are connected via a network 190.

The I/O processing board 110 provides a calculator that processes the I/O of data related to the processing of the host calculator 20. The I/O processing board 110 includes multiple LAN ports 111, multiple LAN ports 112, multiple CPUs 113, multiple memories 114, and multiple storage devices 115. Each of the configurations 111 through 115 is provided plurally to ensure redundancy. However, at least any one of the types of configurations may be provided singularly.

The LAN port 111 provides an interface such as a wired LAN card or a wireless LAN card and communicates with the management board 150 via the network 190.

The LAN port 112 provides an interface such as a wired LAN card or a wireless LAN card and communicates with the host calculator 20 via the network 40.

The CPU 113 executes various processes according to programs stored in the memory 114 and/or the storage device 115.

The memory 114 represents RAM, for example, and stores programs executed by the CPU 113 and necessary information.

The storage device 115 represents a hard disk or flash memory, for example, and stores programs executed by the CPU 113, data used by the CPU 113, and data used by the host computer 20.

The management board 150 provides a calculator that performs processing related to the maintenance and support for the storage apparatus 100 to be maintained. The management board 150 includes a LAN port 151, a LAN port 152, a CPU 153 as an example of the processor, memory 154, and a storage device 155. The memory 154 and the storage device 155 correspond to a storage device in the appended claims.

The LAN port 151 provides an interface such as a wired LAN card or a wireless LAN card and communicates with the management calculator 10 via the management network 30.

The LAN port 152 provides an interface such as a wired LAN card or a wireless LAN card and communicates with the I/O processing board 110 via the network 190.

The CPU 153 executes various processes according to programs stored in the memory 154 and/or the storage device 155.

The memory 154 represents RAM, for example, and stores programs executed by the CPU 153 and necessary information.

The storage device 155 represents a hard disk or flash memory, for example, and stores programs executed by the CPU 153 and data used by the CPU 153.

The description below explains programs stored in the memory 114 of the I/O processing board 110.

Figure 2:
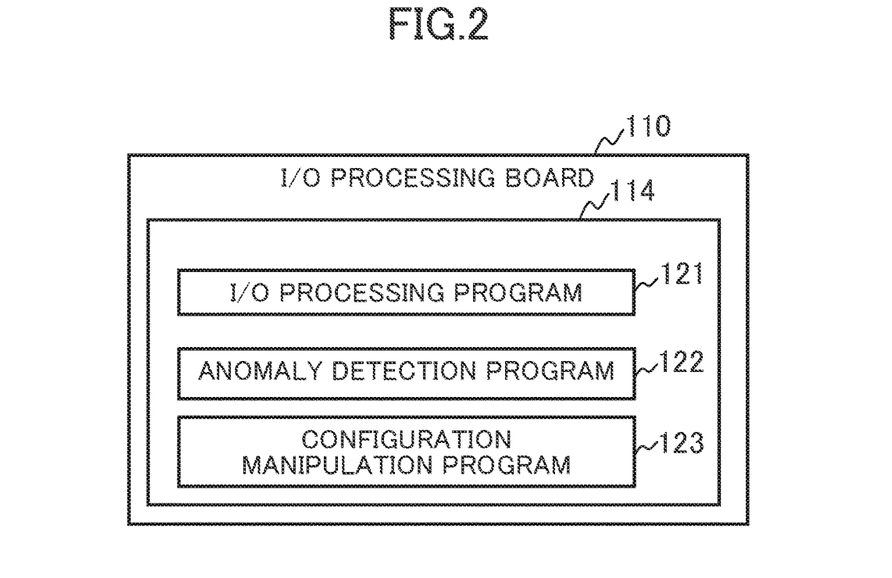
FIG. 2 is a configuration diagram illustrating memory on an I/O processing board according to the first embodiment.

FIG. 2 is a configuration diagram illustrating the memory on the I/O processing board according to the first embodiment.

The memory 114 of the I/O processing board 110 stores an I/O processing program 121, an anomaly detection program 122, and a configuration manipulation program 123.

The I/O processing program 121 is executed by the CPU 113 to perform I/O processing according to an I/O request from the host calculator 20. The anomaly detection program 122 is executed by the CPU 113 to detect various configuration anomalies (failures) on the I/O processing board 110 and issues notification to the management board 150. The configuration manipulation program 123 receives manipulation instructions on various configurations of the I/O processing board 110 from the management board 150 and performs manipulations for the configurations according to the manipulation instructions.

Figure 3:
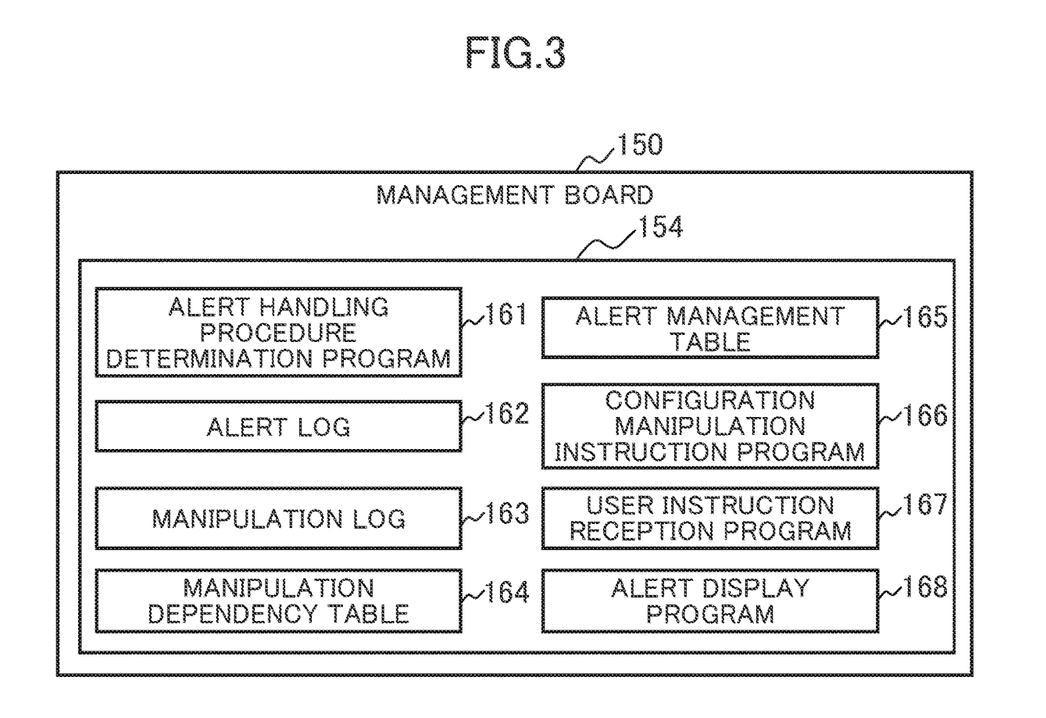
FIG. 3 is a configuration diagram illustrating memory on a management board according to the first embodiment.

The description below explains programs and information stored in the memory 154 of the management board 150.

FIG. 3 is a configuration diagram illustrating memory on the management board according to the first embodiment.

The memory 154 of the management board 150 stores an alert handling procedure determination program 161, an alert log 162, a manipulation log 163, a manipulation dependency table 164, an alert management table 165, a configuration manipulation instruction program 166, a user instruction reception program 167, and an alert display program 168. The alert log 162, the manipulation log 163, the manipulation dependency table 164, and the alert management table 165 are stored in the storage device 155, for example, and may be read to the memory 154 as needed. Details of the alert log 162, the manipulation log 163, the manipulation dependency table 164, and the alert management table 165 will be described later.

The alert handling procedure determination program 161 determines the order to perform handling manipulations so that multiple handling manipulations corresponding to multiple failures occurring on the storage apparatus 100 satisfy predetermined conditions (those specified in the manipulation dependency table 164 according to the present embodiment). As a specific process, the alert handling procedure determination program 161 is executed by the CPU 153 to store alert information corresponding to an anomaly notified from the I/O processing board 110 in the alert log 162. The alert handling procedure determination program 161 is executed by the CPU153 to perform an alert handling procedure determination process (see FIG. 8) that determines a handling procedure corresponding to the alert. The user instruction reception program 167 is executed by the CPU 153 to receive the user's manipulation instructions on various configurations of the I/O processing board 110 from the management calculator 10. The configuration manipulation instruction program 166 is executed by the CPU 153 to transmit the operation instructions received by the user instruction reception program 167 to the I/O processing board 110. The alert display program 168 is executed by the CPU 153 to display a screen containing a sequence of alert handling based on the information in the alert management table 165. The alert display program 168 allows the management calculator 10 to display the screen, for example.

Figure 4:
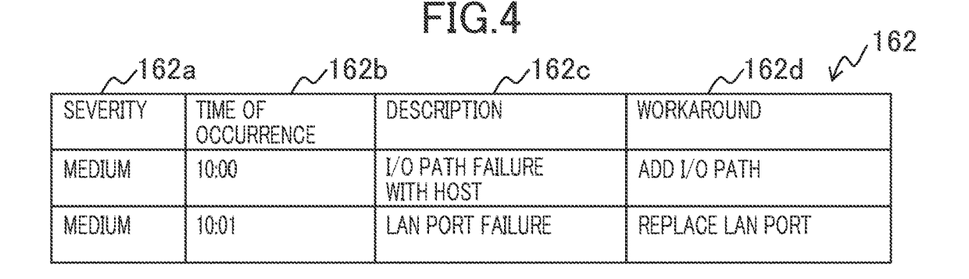
FIG. 4 is a configuration diagram illustrating an alert log according to the first embodiment.

The alert log 162 will be described in detail.

FIG. 4 is a configuration diagram illustrating the alert log according to the first embodiment.

The alert log 162 stores failure handling information and stores entries for each alert concerning failures occurring on the I/O processing board 110. Each entry for the alert log 162 contains fields for severity 162a, time of occurrence 162b, description 162c, and workaround 162d.

The severity 162a stores the severity of a failure indicated by the alert corresponding to the entry. For example, the management board 100 may identify and store the severity for the failure notified from the I/O processing board 110 based on the previously stored correspondence between the fault and the severity. The time of occurrence 162b stores the time of occurrence of a failure corresponding to the entry. The description 162c contains the description of a failure corresponding to the entry. The workaround 162d stores the workaround (manipulation) for a failure corresponding to the entry. For example, the management board 150 may identify and store the workaround for a failure notified from the I/O processing board 110 based on the previously stored correspondence between the failure description and the workaround.

In FIG. 4, the first entry of the alert log 162 indicates that an alert of medium severity occurred at 10:00, the failure description denotes an I/O path failure with the host, and the workaround is to add an I/O path. The second entry indicates that an alert of medium severity occurred at 10:01, the failure description denotes a LAN port failure, and the workaround is to replace the LAN port.

Figure 5:
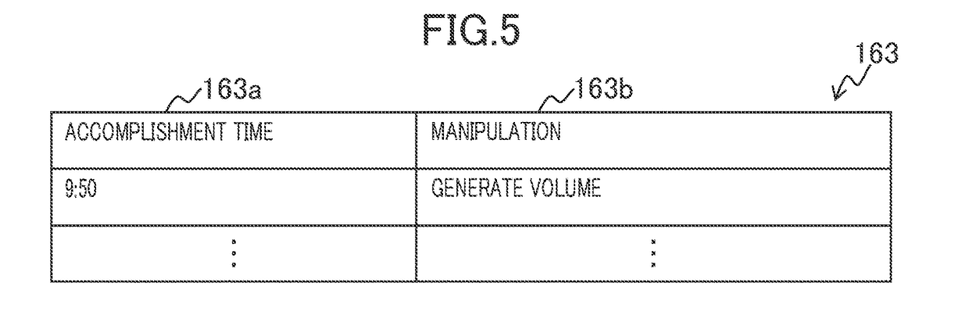
FIG. 5 is a configuration diagram illustrating a manipulation log according to the first embodiment.

The manipulation log 163 will be described in detail.

FIG. 5 is a configuration diagram illustrating the manipulation log according to the first embodiment.

The manipulation log 163 stores entries for various manipulations on the I/O processing board 110. Each entry for the manipulation log 163 contains fields of accomplishment time 163a and manipulation 163b.

The accomplishment time 163a stores the time when the manipulation corresponding to the entry was performed. The manipulation 163b stores the description of the manipulation corresponding to the entry.

In FIG. 5, the first entry of the manipulation log 163 indicates that the manipulation to generate a volume was performed at 9:50.

Figure 6:
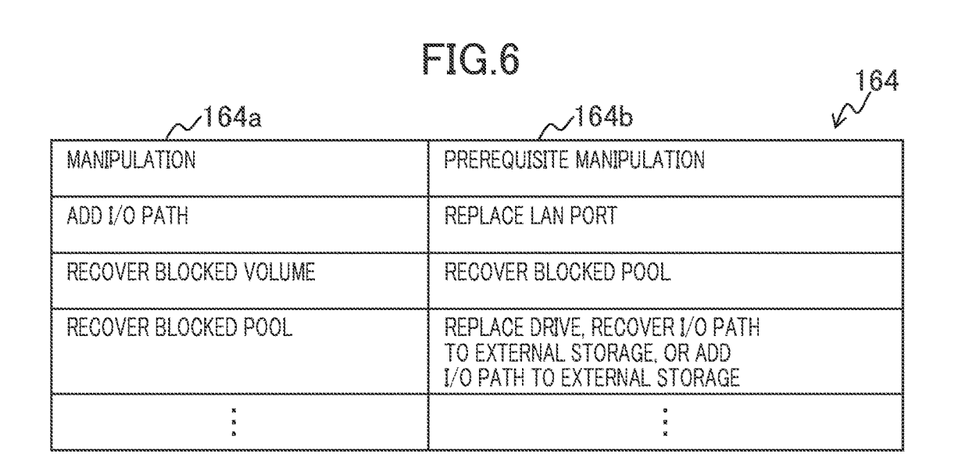
FIG. 6 is a configuration diagram illustrating a manipulation dependency table according to the first embodiment.

The manipulation dependency table 164 will be described in detail.

FIG. 6 is a configuration diagram illustrating the manipulation dependency table according to the first embodiment.

The manipulation dependency table 164 stores condition information, namely, the relationship between the manipulation and the condition concerning at least accomplishment or non-accomplishment of the manipulation (preconditioned manipulation to be performed to perform the manipulation according to the present embodiment). The manipulation dependency table 164 stores entries for each manipulation. Each entry for the manipulation dependency table 164 contains fields of manipulation 164a and prerequisite manipulation 164b.

The manipulation 164a stores the description of the manipulation corresponding to the entry. The prerequisite manipulation 164b stores manipulation (prerequisite manipulation) prerequisite for the manipulation corresponding to the entry.

In FIG. 6, the first entry of the manipulation dependency table 164 indicates that the manipulation of adding an I/O path presupposes the manipulation of replacing the LAN port. The second entry indicates that the manipulation of recovering a blocked volume presupposes the manipulation of recovering a blocked pool. The third entry indicates that the manipulation of recovering a blocked pool presupposes the manipulation of replacing the drive, recovering the I/O path to external storage, or adding an I/O path to the external storage.

Figure 7:
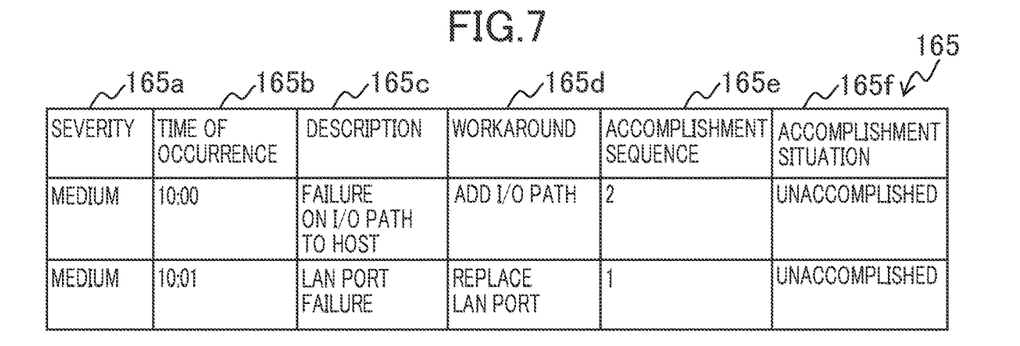
FIG. 7 is a configuration diagram illustrating an alert management table according to the first embodiment.

The alert management table 165 will be described in detail.

FIG. 7 is a configuration diagram illustrating the alert management table according to the first embodiment.

The alert management table 165 manages information such as workaround for the alert corresponding to occurred failure and an accomplishment sequence and stores entries for each alert. Each entry for the alert management table 165 contains fields of severity 165a, time of occurrence 165b, description 165c, workaround 165d, accomplishment sequence 165e, and accomplishment situation 165f.

The severity 165a stores the severity of the failure indicated by the alert corresponding to the entry. The time of occurrence 165b stores the time of occurrence of the failure indicated by the alert corresponding to the entry. The description 165c contains the description of the failure corresponding to the entry. The workaround 165d stores the workaround (manipulation) for the failure corresponding to the entry. The accomplishment sequence 165e stores an accomplishment sequence to be handled for the failure corresponding to the entry under the condition of the occurring failure. The accomplishment situation 165*f* stores the accomplishment situation of handling the failure corresponding to the entry.

In FIG. 7, the first entry for the alert management table 165 indicates that a failure occurred at 10:00 on an I/O path to the host, the severity of this failure is medium, the workaround is to add an I/O path, and the handling accomplishment sequence is second and is not accomplished yet. The second entry indicates that a LAN port failure occurred at 10:01, the severity of this failure is medium, the workaround is to replace the LAN port, and the handling accomplishment sequence is first and is not accomplished yet.

The description below explains the processing operations of the maintenance support system 1.

Figure 8:
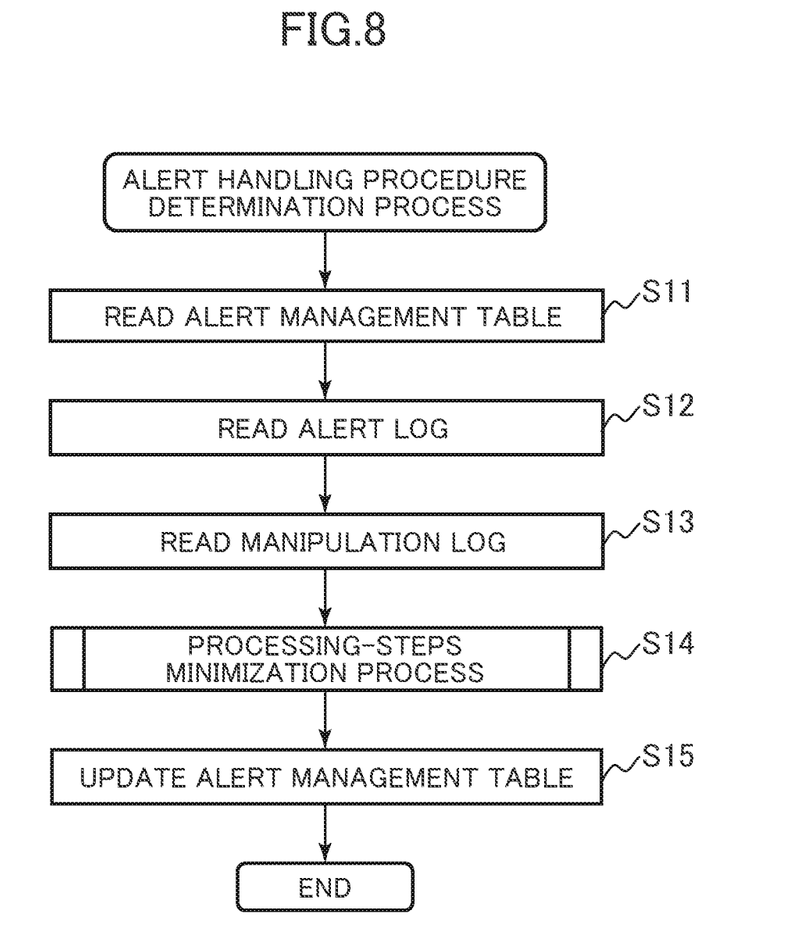
FIG. 8 is a flowchart of an alert handling procedure determination process according to the first embodiment.

FIG. 8 is a flowchart of an alert handling procedure determination process according to the first embodiment.

For example, the alert handling procedure determination process may be performed when a new alert occurs, or when a user gives a manipulation instruction from the management calculator 10.

The alert handling procedure determination program 161 (strictly speaking, the CPU 153 to execute the alert handling procedure determination program 161) reads the alert management table 165 from the storage device 155 into the memory 154 (step S11).

The alert handling procedure determination program 161 then reads the alert log 162 from the storage device 155 into the memory 154 and registers an alert entry in the alert log 162 to the alert management table 165 if the entry is not registered to the alert management table 165 (step S12).

The alert handling procedure determination program 161 then reads the manipulation log 163 from the storage device 155 into the memory 154 and updates the accomplishment situation of the alert management table 165 based on the manipulation log 163 (step S13).

The alert handling procedure determination program 161 then executes a processing-steps minimization process (see FIG. 9) to determine the accomplishment sequence for each alert (step S14).

The alert handling procedure determination program 161 then updates the alert management table 165 based on the accomplishment sequence determined by the processing-steps minimization process (step S15).

The alert handling procedure determination process determines the accomplishment sequence of handling alerts in the alert management table 165 in an appropriate order. When subsequently receiving an instruction to display the alert from the management calculator 10, the alert display program 168 references the alert management table 165 and allows the management calculator 10 to display a screen including the description of the alert management table 165. The alert display program 168 may display the alert information contained in the alert management table 165 in the order of entries or in the sorted order according to the accomplishment sequence.

Figure 9:
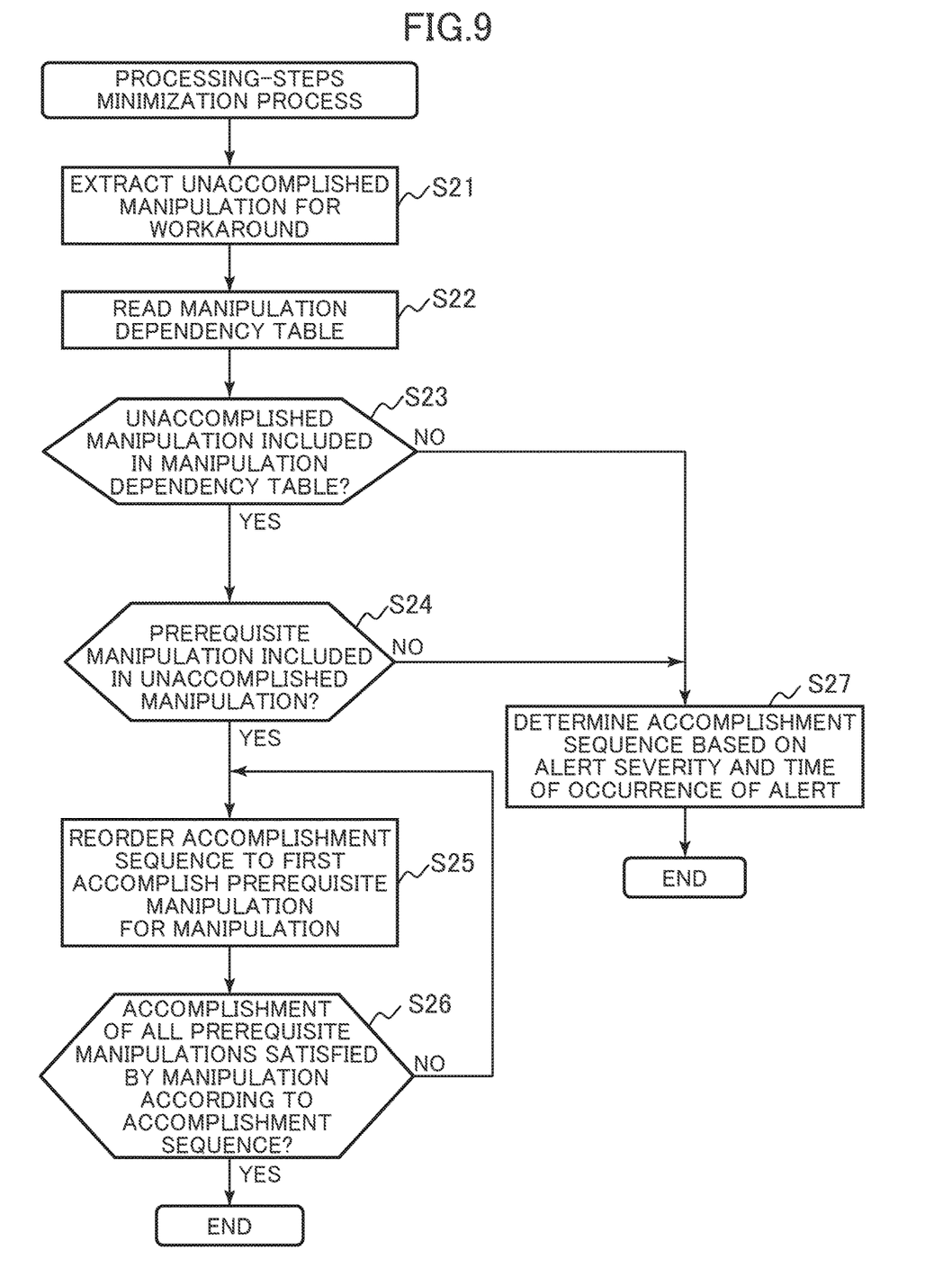
FIG. 9 is a flowchart of a processing-steps minimization process according to the first embodiment.

The processing-steps minimization process in step S14 will be described.

FIG. 9 is a flowchart of the processing-steps minimization process according to the first embodiment.

The alert handling procedure determination program 161 extracts the manipulation for the workaround 165*d* belonging to the entry containing the accomplishment situation 165*f* indicated as being unaccomplished from the alert management table 165 (step S21).

The alert handling procedure determination program 161 then reads the manipulation dependency table 164 from the storage device 155 to the memory 154 (step S22).

The alert handling procedure determination program 161 then determines whether the manipulation (extracted manipulation) extracted in step S21 is included in the manipulation 164*a* of the manipulation dependency table 164 (step S23).

As a result, the extracted manipulation may be included in the manipulation dependency table 164 (step S23: YES). Then, the alert handling procedure determination program 161 determines whether the extracted manipulation corresponds to the prerequisite manipulation 164*b* in the manipulation dependency table 164 (step S24).

As a result, the extracted manipulation may include a prerequisite manipulation (step S24: YES). Then, the alert handling procedure determination program 161 reorders the accomplishment sequence so that the prerequisite manipulation is accomplished before the extracted manipulation (step S25).

The alert handling procedure determination program 161 determines whether an accomplishment of the extracted manipulation according to the reordered accomplishment sequence satisfies an accomplishment of all the prerequisite manipulations (step S26).

As a result, an accomplishment of the extracted manipulation may satisfy the accomplishment of all the prerequisite manipulations (step S26: YES). Then, the alert handling procedure determination program 161 terminates the processing-steps minimization process. The accomplishment of the extracted manipulation may not satisfy the accomplishment of all the prerequisite manipulations (step S26: NO). Then, the alert handling procedure determination program 161 advances the process to step S25.

The extracted manipulation may not belong to the manipulation dependency table 164 (step S23: NO). Alternatively, the extracted manipulation may not include a prerequisite manipulation (step S24: NO). Then, the alert handling procedure determination program 161 determines the accomplishment sequence based on the alert severity and the time of occurrence of the alert (step S27) and terminates the processing-steps minimization process. Specifically, the alert handling procedure determination program 161 determines the accomplishment sequence in descending order of the severity or in the chronological order of the time of occurrence concerning the same severity.

When a given manipulation is associated with the prerequisite manipulation, the above-described processing-steps minimization process can determine the accomplishment sequence to perform the prerequisite manipulation first. This makes it possible to properly perform the prerequisite manipulation first, regardless of the severity of the alert corresponding to the prerequisite manipulation, for example. It is possible to appropriately prevent a situation where a certain manipulation is performed but stopped or causes an error when the prerequisite manipulation is not performed, for example.

The maintenance support system according to the second embodiment will be described.

The maintenance support system according to the second embodiment uses the same reference numerals for the same components as those of the maintenance support system 1 according to the first embodiment. The description below explains configurations and processes differing from the first embodiment.

Figure 11:
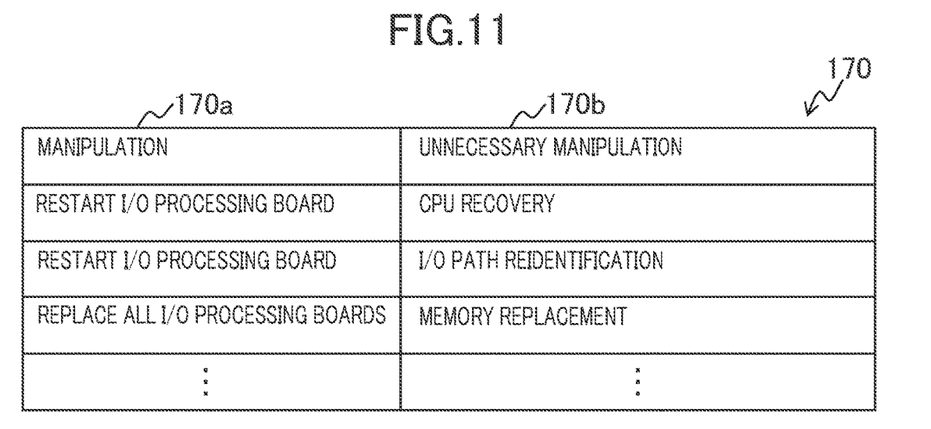
FIG. 11 is a configuration diagram illustrating a manipulation dependency table according to the second embodiment.

The management board 150 of the maintenance support system according to the second embodiment stores an alert handling procedure determination program 169 instead of the alert handling procedure determination program 161 in the management board 150 according to the first embodiment and stores a manipulation dependency table 170 instead of the manipulation dependency table 164.

Figure 10:
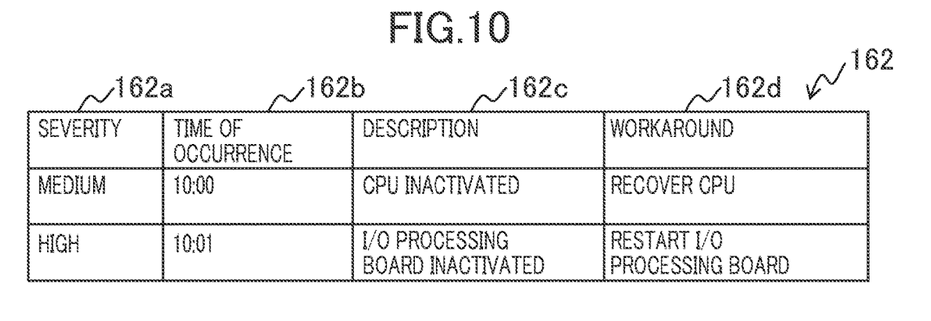
FIG. 10 is a configuration diagram illustrating an alert log according to the second embodiment.

FIG. 10 is a configuration diagram illustrating an alert log according to the second embodiment.

In FIG. 10, the first entry for the alert log 162 indicates that an alert of medium severity occurred at 10:00, the failure description denotes the inactivated CPU, and the workaround is to recover the CPU. The second entry indicates that an alert of high severity occurred at 10:01, the failure description denotes the inactivated I/O processing board, and the workaround is to restart the I/O processing board.

FIG. 11 is a configuration diagram illustrating a manipulation dependency table according to the second embodiment.

The manipulation dependency table 170 stores the relationship between a manipulation and a condition (a manipulation (unnecessary manipulation) identified as unneeded by performing that manipulation according to the present embodiment) concerning at least accomplishment or non-accomplishment of that manipulation. The manipulation dependency table 170 stores entries for the manipulations. Each entry for the manipulation dependency table 170 contains fields of manipulation 170a and unnecessary manipulation 170b.

The manipulation 170a stores the description of manipulation for the workaround corresponding to the entry. The unnecessary manipulation 170b stores a manipulation (unnecessary manipulation) identified as unneeded by performing the manipulation corresponding to the entry.

In FIG. 11, the first entry for the manipulation dependency table 170 indicates that the manipulation to restart the I/O processing board unnecessitates the manipulation to recover the CPU. The second entry indicates that the manipulation to restart the I/O processing board unnecessitates the manipulation to reidentify the I/O path. The third entry indicates that the manipulation to replace all the I/O processing boards unnecessitates the manipulation to replace the memory.

Figure 12:
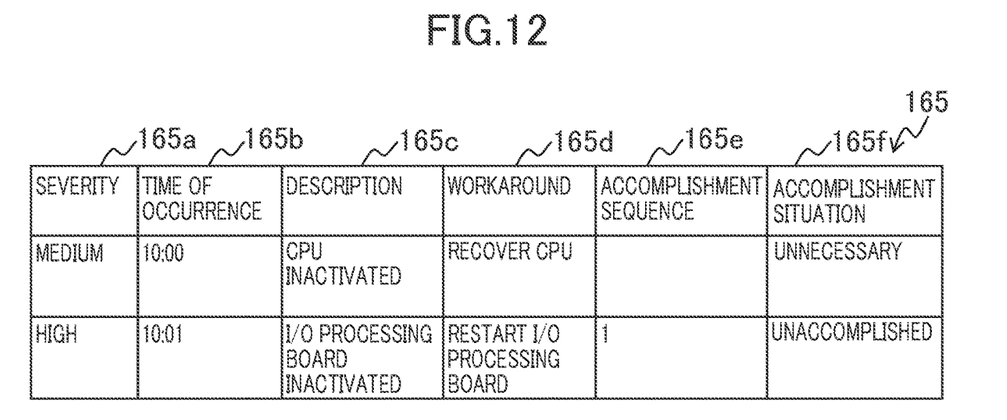
FIG. 12 is a configuration diagram illustrating an alert management table according to the second embodiment.

FIG. 12 is a configuration diagram illustrating the alert management table according to the second embodiment.

The alert management table 165 illustrated in FIG. 12 shows states after the alert handling procedure determination process is performed. The first entry indicates that the CPU was inactivated at 10:00, the failure severity is medium, the workaround is to recover the CPU, there is no accomplishment sequence for handling, and no manipulation is needed. The second entry indicates that the I/O processing board was inactivated at 10:01, the failure severity is high, the workaround is to restart the I/O processing board, and the handling is the first in the accomplishment sequence and is not accomplished.

The description below explains the processing operations of the maintenance support system 1 according to the second embodiment.

Figure 13:
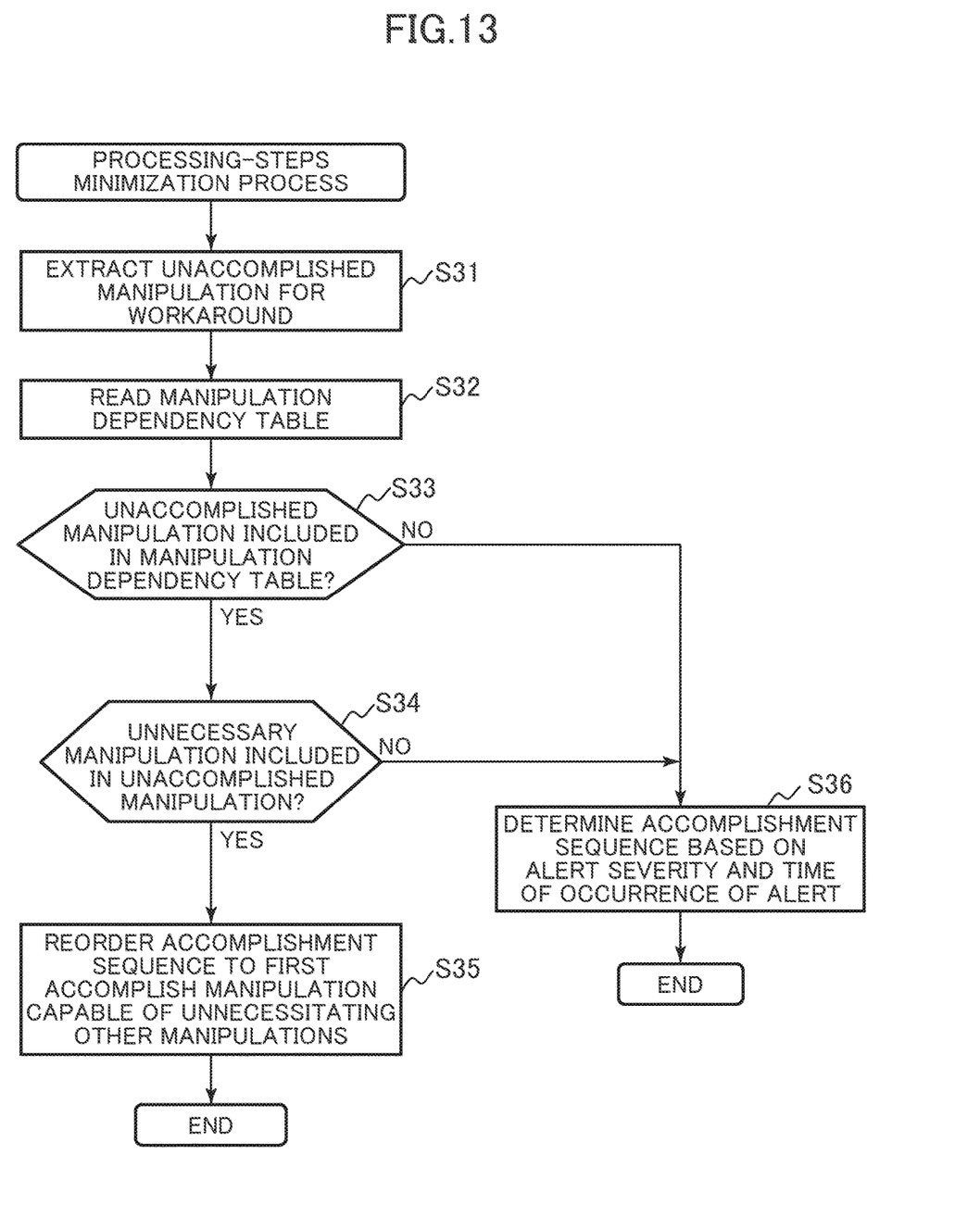
FIG. 13 is a flowchart of a processing-steps minimization process according to the second embodiment.

The alert handling procedure determination process according to the second embodiment performs the processing-steps minimization process in FIG. 13 at step S14 of the alert handling procedure determination process according to the first embodiment.

FIG. 13 is a flowchart of the processing-steps minimization process according to the second embodiment.

The alert handling procedure determination program 169 extracts the manipulation of the workaround 165d corresponding to the entry containing the accomplishment situation 165f identified as being unaccomplished from the alert management table 165 (step S31).

The alert handling procedure determination program 169 then reads the manipulation dependency table 170 from the storage device 155 to the memory 154 (step S32).

The alert handling procedure determination program 169 determines whether the manipulation (extracted manipulation) extracted at step S31 belongs to the manipulation 170a of the manipulation dependency table 170 (step S33).

As a result, the extracted manipulation may be included in the manipulation dependency table 170 (step S33: YES). Then, the alert handling procedure determination program 169 determines whether the extracted manipulation includes the unnecessary manipulation 170b in the manipulation dependency table 170 (step S34). The unnecessary manipulation 170b lists manipulations identified to be unnecessary as a result of performing the corresponding manipulation.

The extracted manipulation may include an unnecessary manipulation (step S34: YES). Then, the alert handling procedure determination program 169 reorders the accomplishment sequence to first accomplish the extracted manipulation capable of unnecessitating the other manipulations and unnecessitates a manipulation identified to be unnecessary due to the extracted manipulation (step S35). The processing-steps minimization process then terminates.

The extracted manipulation may not include any manipulation belonging to the manipulation dependency table 170 (step S33: NO). Alternatively, the extracted manipulation does not include any unnecessary manipulation (step S34: NO). Then, the alert handling procedure determination program 169 determines the accomplishment sequence based on the alert severity and the time of occurrence of the alert (step S36). The processing-steps minimization process then terminates. Specifically, the alert handling procedure determination program 169 determines the accomplishment sequence in descending order of the severity or in the chronological order of the time of occurrence concerning the same severity.

When a given manipulation unnecessitates manipulation, the above-described processing-steps minimization process can determine the accomplishment sequence to first accomplish the given manipulation. This makes it possible to first perform the manipulation capable of unnecessitating other manipulations, regardless of the severity of the alert corresponding to the manipulation, for example. Therefore, it is possible to appropriately prevent an unnecessary manipulation from being accomplished, for example.

The above-described processing-steps minimization process allows the alert handling procedure determination process to determine an appropriate accomplishment sequence of handling for each alert in the alert management table 165. The alert display program 168 subsequently receives an alert display instruction, if any, from the management calculator 10, references the alert management table 165, and allows the management calculator 10 to display a screen containing the description in the alert management table 165. The alert display program 168 may display the alert information included in the alert management table 165 in that order or in the sorted order according to the accomplishment sequence. The alert display program 168 may generate a screen that can recognizably display the manipulation identified to be unnecessary by the processing-steps minimization process.

The description below explains the maintenance support system according to the third embodiment.

The maintenance support system according to the third embodiment uses the same reference numerals for the same components as those of the maintenance support system 1 according to the first embodiment. The description below explains configurations and processes differing from the first embodiment.

Figure 14:
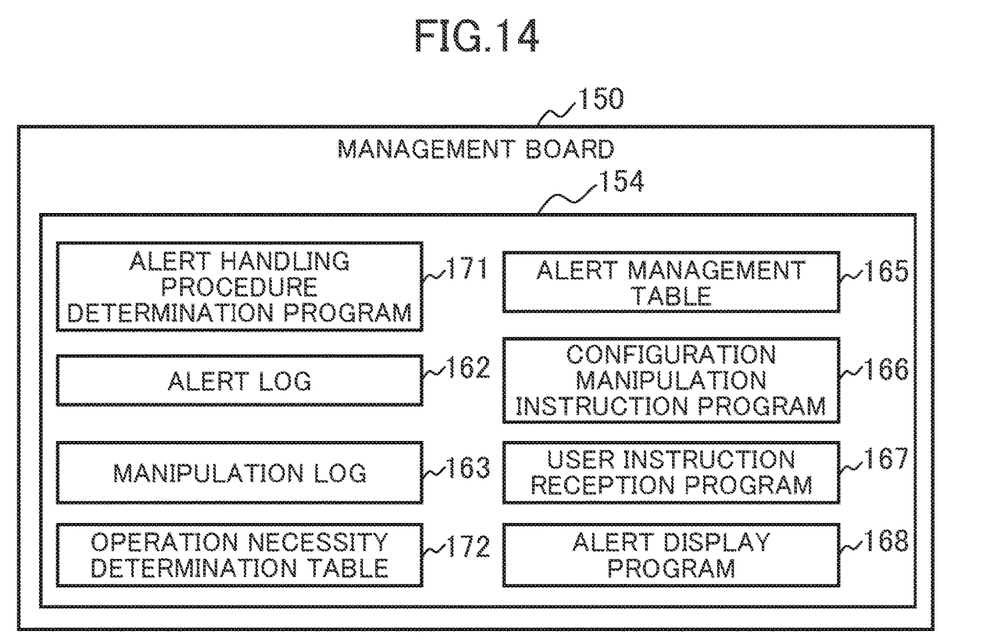
FIG. 14 is a configuration diagram illustrating memory on a management board according to a third embodiment.

FIG. 14 is a configuration diagram illustrating memory on a management board according to a third embodiment.

The memory 154 of the management board 150 stores an alert handling procedure determination program 171, the alert log 162, the manipulation log 163, an operation necessity determination table 172, the alert management table 165, the configuration manipulation instruction program 166, the user instruction reception program 167, and the alert display program 168. The operation necessity determination table 172 is stored in the storage device 155, for example, and may be read to the memory 154 as needed. Details of operation necessity determination table 172 will be described later.

The alert handling procedure determination program 171 is executed by the CPU 153 to store the alert information corresponding to an anomaly notified from the I/O processing board 110 in the alert log 162. The alert handling procedure determination program 171 is executed by CPU 153 to perform the alert handling procedure determination process (see FIG. 8) that determines a procedure to handle alerts. The alert handling procedure determination program 171 performs the processing-steps minimization process at step S14 of the alert handling procedure determination process in FIG. 19.

Figure 15:
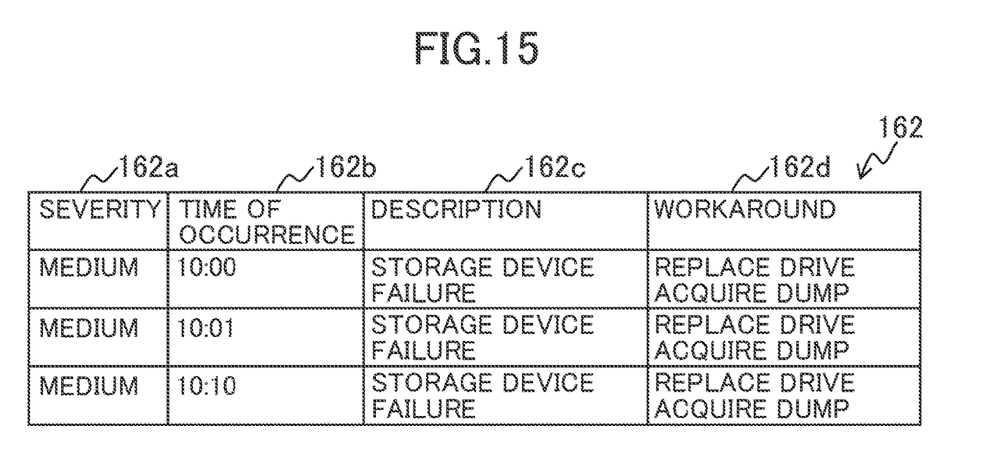
FIG. 15 is a configuration diagram illustrating an alert log according to the third embodiment.

FIG. 15 is a configuration diagram illustrating an alert log according to the third embodiment.

In FIG. 15, the first entry for the alert log 162 indicates that an alert of medium severity occurred at 10:00, the failure description denotes a storage device failure, and the workaround is to replace the drive and acquire a dump. The second entry indicates that an alert of medium severity occurred at 10:01, the failure description denotes a storage device failure, and the workaround is to replace the drive and acquire a dump. The third entry indicates that an alert of medium severity occurred at 10:10, the failure description denotes a storage device failure, and the workaround is to replace the drive and acquire a dump. The dump acquisition is a manipulation that acquires dumps of a common area indicating states of the storage device 115 corresponding to the memory 114 even when any of the storage device 115 fails.

Figure 16:
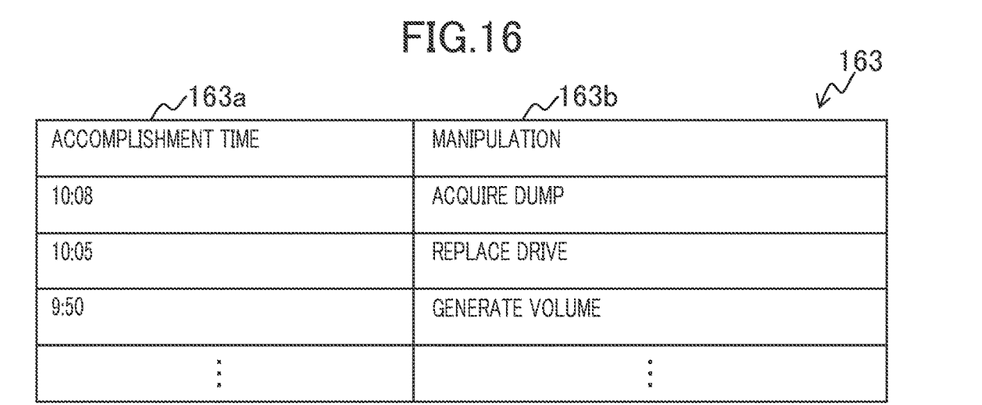
FIG. 16 is a configuration diagram illustrating a manipulation log according to the third embodiment.

FIG. 16 is a configuration diagram illustrating a manipulation log according to the third embodiment.

In FIG. 16, the first entry for the manipulation log 163 indicates that the manipulation of acquiring a dump was performed at 10:08. The second entry indicates that the manipulation of replacing the drive was performed at 10:05. The third entry indicates that the manipulation of generating a volume was performed at 9:50.

Figure 17:
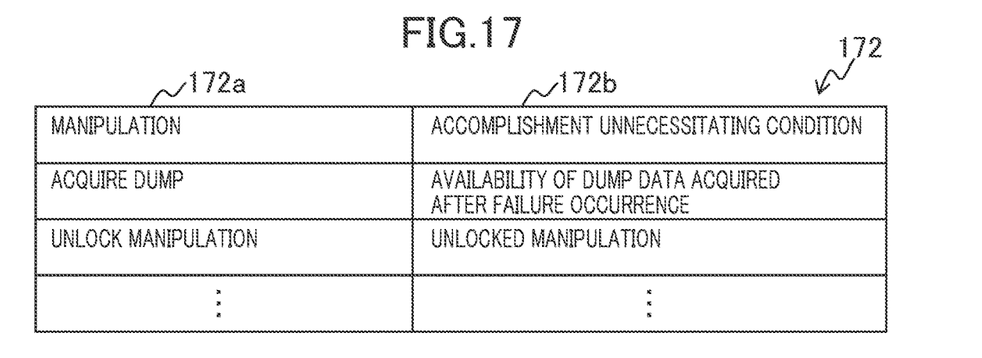
FIG. 17 is a configuration diagram illustrating an operation necessity determination table according to the third embodiment.

FIG. 17 is a configuration diagram illustrating an operation necessity determination table according to the third embodiment.

The operation necessity determination table 172 stores the relationship between a manipulation and a condition (to unnecessitate the manipulation according to the present embodiment) concerning at least accomplishment or non-accomplishment of that manipulation. The operation necessity determination table 172 stores entries for the manipulations. Each entry for the operation necessity determination table 172 contains fields of manipulation 172a and an accomplishment unnecessitating condition 172b.

The manipulation 172a stores the description of a workaround manipulation corresponding to the entry. The accomplishment unnecessitating condition 172b stores a condition (unnecessitating condition) that unnecessitates the manipulation corresponding to the entry.

In FIG. 17, the first entry for the operation necessity determination table 172 indicates that the manipulation of dump acquisition need not be performed under the condition that there is dump data acquired after the failure occurred. The second entry indicates that the manipulation of manipulation unlocking need not be performed under the condition that the manipulation lock is inactive.

Figure 18:
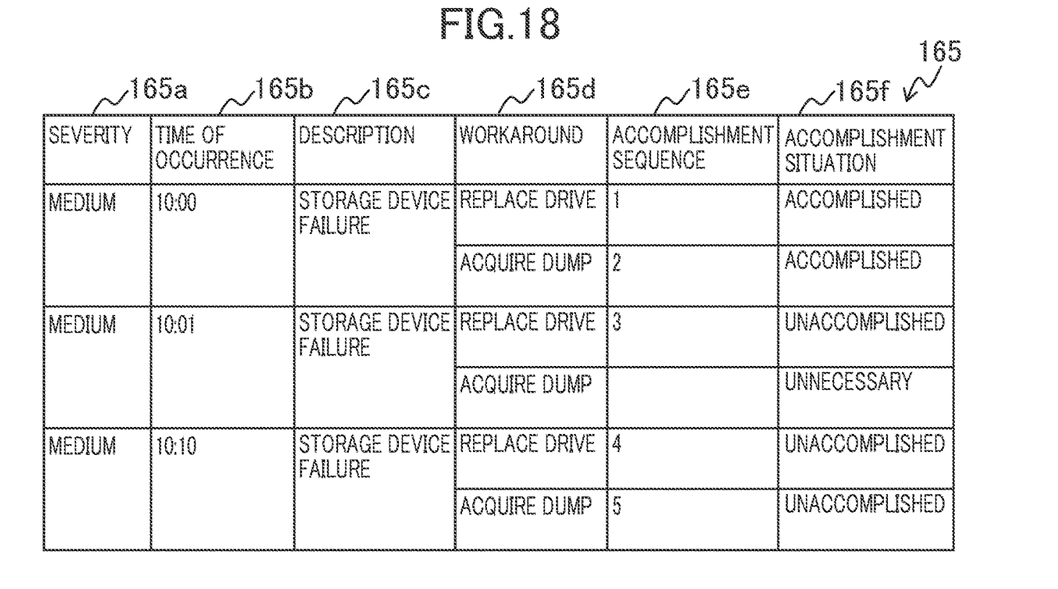
FIG. 18 is a configuration diagram illustrating an alert management table according to the third embodiment.

FIG. 18 is a configuration diagram illustrating an alert management table according to the third embodiment.

The alert management table 165 illustrated in FIG. 18 shows states after the alert handling procedure determination process is performed. The first entry indicates that a storage device failure occurred at 10:00, the failure severity is medium, the workaround is to replace the drive and acquire a dump, the drive replacement is the first accomplishment sequence and is already accomplished, and the dump acquisition is the second accomplishment sequence and is already accomplished. The second entry indicates that a storage device failure occurred at 10:01, the failure severity is medium, the workaround is to replace the drive and acquire a dump, the drive replacement is the third accomplishment sequence and is unaccomplished, and the dump acquisition corresponds to no accomplishment sequence and is unnecessary. The third entry indicates that a storage device failure occurred at 10:10, the failure severity is medium, the workaround is to replace the drive and acquire a dump, the drive replacement is the fourth accomplishment sequence and is unaccomplished, and the dump acquisition is the fifth accomplishment sequence and is unaccomplished.

The description below explains the processing operations of the maintenance support system 1 according to the third embodiment.

Figure 19:
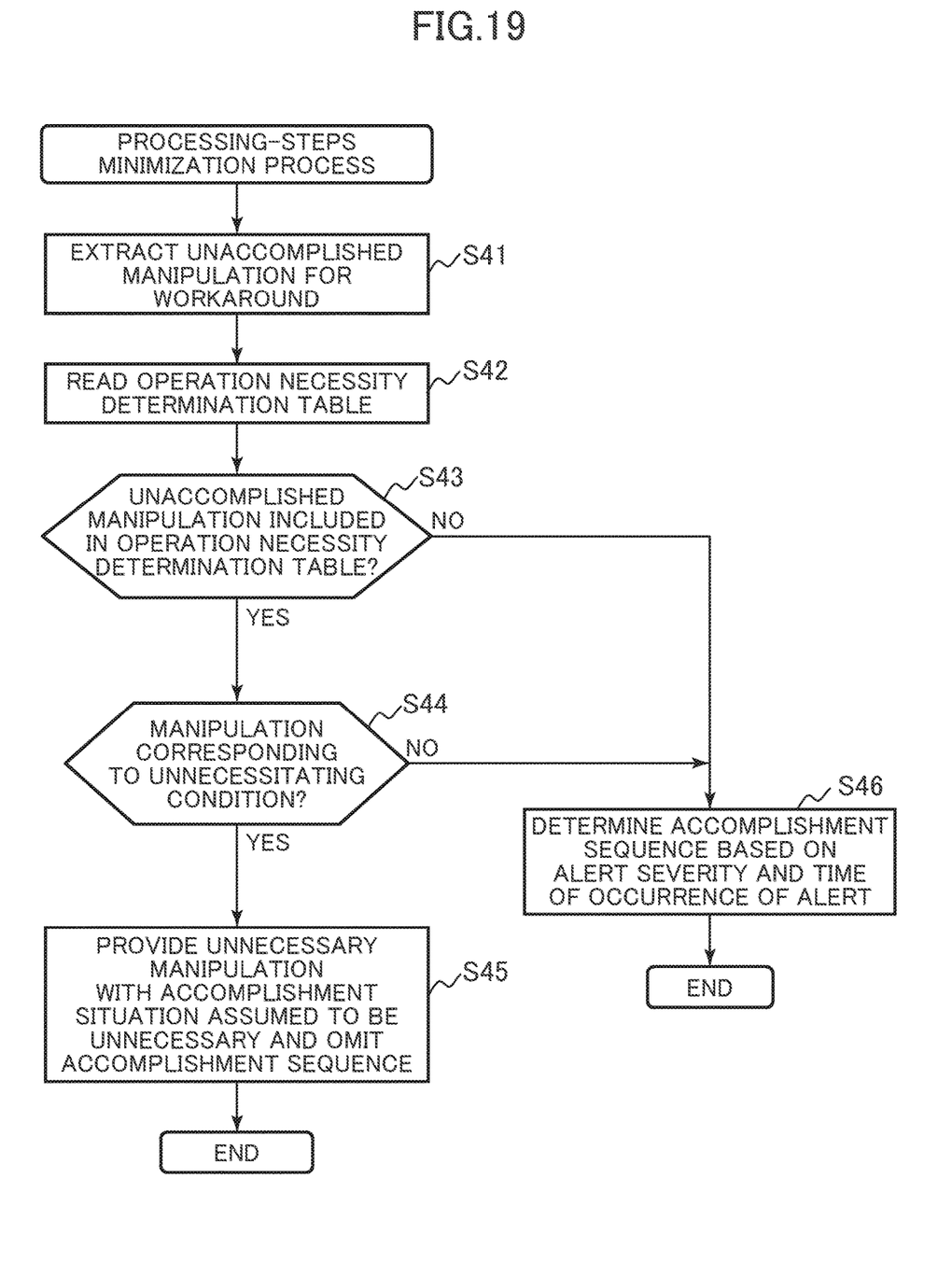
FIG. 19 is a flowchart of a processing-steps minimization process according to the third embodiment.

The alert handling procedure determination process according to the third embodiment performs the processing-steps minimization process illustrated in FIG. 19 at step S14 of the alert handling procedure determination process according to the first embodiment.

FIG. 19 is a flowchart of a processing-steps minimization process according to the third embodiment.

The alert handling procedure determination program 171 extracts the manipulation for the workaround 165d belonging to the entry containing the accomplishment situation 165f marked as unaccomplished from the alert management table 165 (step S41).

The alert handling procedure determination program 171 then reads the operation necessity determination table 172 from the storage device 155 to the memory 154 (step S42).

The alert handling procedure determination program 171 determines whether the manipulation (extracted manipulation) extracted at step S41 is included in the manipulation 172a in the operation necessity determination table 172 (step S43).

As a result, the extracted manipulation may correspond to the manipulation included in the operation necessity determination table 172 (step S43: YES). Then, the alert handling procedure determination program 171 determines whether the manipulation includes a condition to unnecessitate the manipulation, namely, whether the condition corresponds to the unnecessitating condition 172b of the manipulation dependency table 172 (step S44).

As a result, there may be the corresponding unnecessitating condition (step S44: YES). Then, the alert handling procedure determination program 171 assumes the manipulation to be unnecessary and provides no accomplishment sequence (step S45). Then, the processing-steps minimization process terminates.

The extracted manipulation may not include any manipulation included in the operation necessity determination table 172 (step S43: NO). Alternatively, there may be no corresponding unnecessitating condition (step S44: NO). Then, the alert handling procedure determination program 171 determines the accomplishment sequence based on the alert severity and the time of occurrence of the alert (step S46). The processing-steps minimization process terminates. Specifically, the alert handling procedure determination program 171 determines the accomplishment sequence in descending order of the severity or in the chronological order of the time of occurrence concerning the same severity.

When there is a condition to unnecessitate a given manipulation, the above-described processing-steps minimization process can prevent the manipulation from being performed. This makes it possible to avoid similar manipulations from being performed redundantly, for example. Therefore, it is possible to appropriately prevent a situation where duplicate manipulations are performed unnecessarily. For example, the second entry for the alert log 162 indicates that an alert occurred at 10:01 according to the time of occurrence. The first entry for the manipulation log 163 indicates that a dump was acquired at 10:08 as the manipulation to handle the alert corresponding to the first entry for the alert log. Therefore, the alert management table 165 indicates that it is unnecessary to collect the dump as the workaround manipulation for the alert corresponding to the second entry for the alert log 162.

The above-described processing-steps minimization process allows the alert handling procedure determination process to determine an appropriate accomplishment sequence of handling for each alert in the alert management table 165. The alert display program 168 subsequently receives an alert display instruction, if any, from the management calculator 10, references the alert management table 165, and allows the management calculator 10 to display a screen containing the description in the alert management table 165. The alert display program 168 may display the alert information included in the alert management table 165 in that order or in the sorted order according to the accomplishment sequence. The alert display program 168 may generate a screen that can recognizably display the manipulation identified to be unnecessary by the processing-steps minimization process.

The present invention is not limited to the above-mentioned embodiments and may be embodied in various modifications without departing from the spirit and scope of the invention.

For example, it may be favorable to combine at least two embodiments of the first to third embodiments.

The above-described embodiments configure the management board 150 using the hardware different from the hardware configuration (such as CPU and memory) of the I/O processing board 110. The present invention is not limited thereto and may configure the management board 150 using the same hardware.

The above-described embodiments have described the example of configuring the management board 150 in the storage apparatus 100. However, The present invention is not limited thereto and may configure the management board 150 as a calculator outside the storage apparatus 100.

What is claimed is:

1. A maintenance support apparatus that determines an accomplishment sequence of handling manipulations for failures on a storage apparatus, the maintenance support apparatus comprising:
   a first processor; and
   a storage device connected to the first processor,
   wherein the storage device stores:
   condition information that associates the handling manipulation with a condition concerning at least one of accomplishment and non-accomplishment of the manipulation; and
   failure handling information that associates a failure occurring on the storage apparatus with the handling manipulation, and
   wherein the first processor determines an accomplishment sequence of a plurality of handling manipulations so that the plural handling manipulations of a plurality of failures occurring on the storage apparatus satisfies the condition,
   wherein the condition applies to a prerequisite manipulation required to perform the handling manipulation,
   wherein the first processor determines an accomplishment sequence for each of the handling manipulations so that the accomplishment sequence allows other handling manipulations corresponding to the prerequisite manipulation for the handling manipulation to be accomplished before the handling manipulation,
   wherein the condition information contains at least one of:
   (A) the handling manipulation is to add an I/O path for the storage apparatus, and the prerequisite manipulation is to replace a communication port for the storage apparatus;
   (B) the handling manipulation is to recover a blocked volume for the storage apparatus, and the prerequisite manipulation is to recover a blocked pool for the storage apparatus; and
   (C) the handling manipulation is to recover a blocked pool for the storage apparatus, and the prerequisite manipulation is one of replacing a storage device of the storage apparatus, recovering an I/O path for an external storage device, and adding an I/O path for an external storage device, and
   wherein a second processor of an I/O processing board used for I/O processing of a storage apparatus performs, based on the condition information, at least one of:
   (i) the prerequisite manipulation of replacing a communication port for the storage apparatus before the handling manipulation of adding an I/O path for the storage apparatus;
   (ii) the prerequisite manipulation of recovering a blocked pool for the storage apparatus before the handling manipulation of recovering a blocked volume for the storage apparatus; and
   (iii) the prerequisite manipulation of one of replacing a storage device of the storage apparatus, recovering an I/O path for an external storage device, and adding an I/O path for an external storage device, before the handling manipulation of recovering a blocked pool for the storage apparatus.

2. The maintenance support apparatus according to claim 1,
   wherein the first processor displays information about the accomplishment sequence.

3. A maintenance support method of a maintenance support apparatus that determines an accomplishment sequence of handling manipulations for failures on a storage apparatus,
- wherein the maintenance support apparatus stores condition information associating the handling manipulation with a condition concerning at least one of implementation and non-execution of the manipulation and failure handling information associating a failure occurring on the storage apparatus with the handling manipulation, and
- wherein the maintenance support apparatus determines an accomplishment sequence of a plurality of handling manipulations so that the plural handling manipulations of a plurality of failures occurring on the storage apparatus satisfies the condition,
- wherein the condition applies to an unnecessary manipulation that renders the handling manipulation unnecessary, and
- wherein the maintenance support apparatus determines an accomplishment sequence for each of the handling manipulations so that the accomplishment sequence allows the handling manipulation to be accomplished before other handling manipulations that are deemed unnecessary by the accomplishment of the handling manipulation and prevents other unnecessary handling manipulations from being accomplished,
- wherein the condition information contains at least one of:
  - (A) the handling manipulation is to restart an I/O processing board used for I/O processing of a storage apparatus, and the unnecessary manipulation is to recover a second processor of the I/O processing board;
  - (B) the handling manipulation is to restart an I/O processing board used for I/O processing of a storage apparatus, and the unnecessary manipulation is to reidentify an I/O path for the I/O processing board; and
  - (C) the handling manipulation is to replace an I/O processing board used for I/O processing of a storage apparatus, and the unnecessary manipulation is to replace memory of the I/O processing board,
- wherein the maintenance support apparatus performs, based on the condition information, at least one of:
  - (i) the handling manipulation of restarting an I/O processing board used for I/O processing of a storage apparatus before the unnecessary manipulation of recovering a second processor of the I/O processing board;
  - (ii) the handling manipulation of restarting an I/O processing board used for I/O processing of a storage apparatus before the unnecessary manipulation of reidentifying an I/O path for the I/O processing board; and
  - (iii) the handling manipulation of replacing an I/O processing board used for I/O processing of a storage apparatus before the unnecessary manipulation of replacing memory of the I/O processing board.

4. A computer program product comprising a non-transitory computer-readable recording medium containing a maintenance support program that allows a computer to perform processes to determine an accomplishment sequence of handling manipulations for failures on a storage apparatus,
- wherein the computer stores:
- condition information that associates the handling manipulation with a condition concerning at least one of accomplishment and non-accomplishment of the manipulation; and
- failure handling information that associates a failure occurring on the storage apparatus with the handling manipulation, and
- wherein the maintenance support program allows the computer to determine an accomplishment sequence of a plurality of handling manipulations so that a plurality of the handling manipulations of a plurality of failures occurring on the storage apparatus satisfies the condition,
- wherein the condition renders accomplishment of the handling manipulation unnecessary,
- wherein the maintenance support program determines an accomplishment sequence for each of the handling manipulations so that the accomplishment sequence prevents the accomplishment of a manipulation that satisfies a condition to render accomplishment of the handling manipulation unnecessary,
- wherein the condition information contains at least one of:
  - (A) the handling manipulation is to acquire a dump of a specified memory area, and the condition rendering the handling manipulation unnecessary is availability of dump data for the specified area acquired after an occurrence of failure; and
  - (B) the handling manipulation is to unlock the storage apparatus, and the condition rendering the handling manipulation unnecessary is an unlocked state of the storage apparatus, and
- wherein the maintenance support program performs, based on the condition information, at least one of:
  - (i) the handling manipulation of acquiring a dump of a specified memory area before the condition of dumping data for the specified area acquired after an occurrence of failure; and
  - (ii) the handling manipulation of unlocking the storage apparatus before the condition of an unlocked state of the storage apparatus.

5. The maintenance support method according to claim 3, wherein the maintenance support apparatus recognizably displays unaccomplished handling manipulation.

6. The computer program product according to claim 4, wherein the maintenance support program recognizably displays unaccomplished handling manipulation.

* * * * *